3,088,325
SNAP-ACTING SAFETY VALVE DEVICE

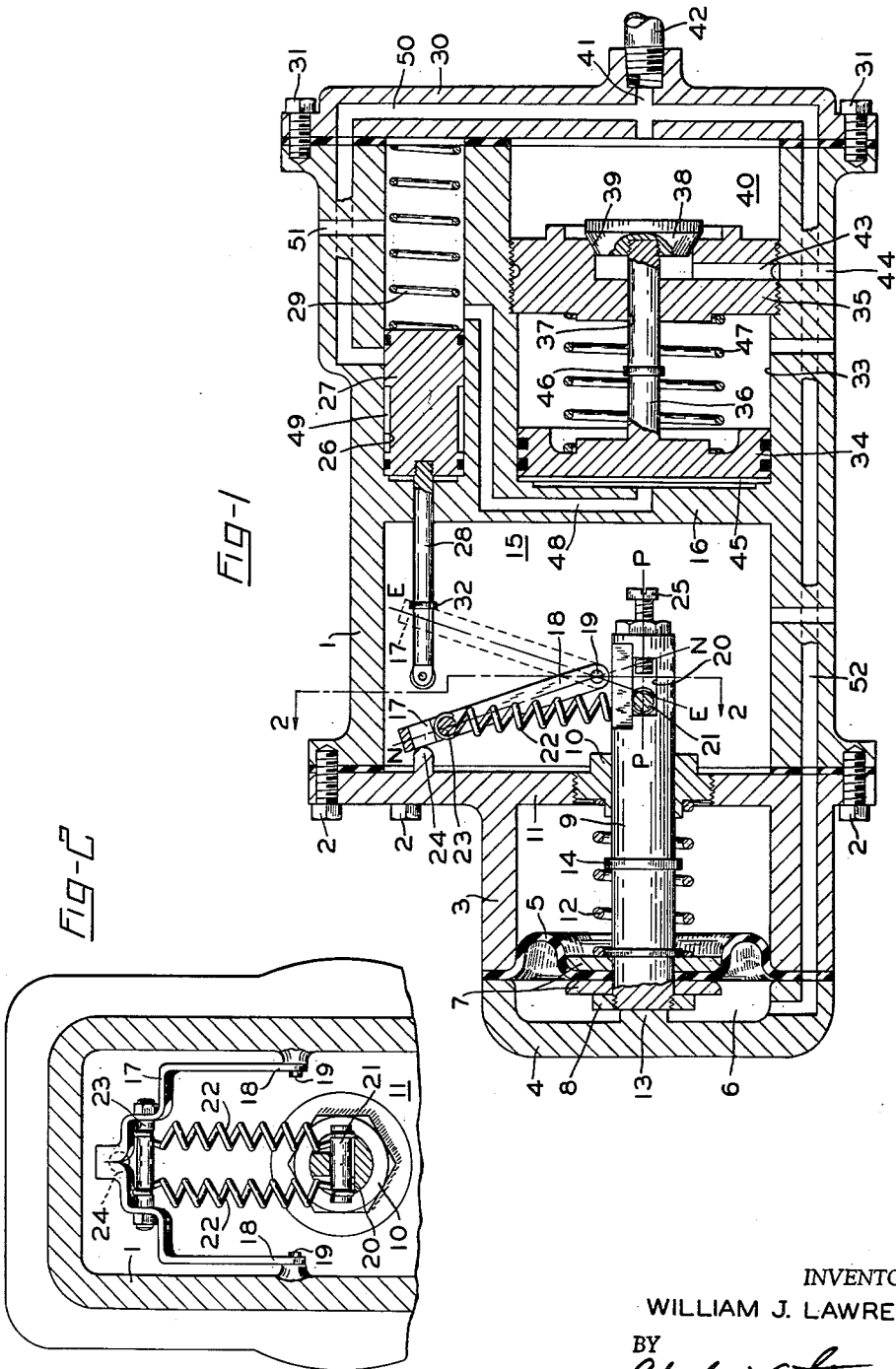

William J. Lawrence, Trafford, Pa., assignor to Westinghouse Air Brake Company, Wilmerding, Pa., a corporation of Pennsylvania
Filed May 25, 1959, Ser. No. 815,405
2 Claims. (Cl. 74—100)

This invention relates to snap-acting safety valve devices of the type having maximum and minimum pressure settings at which the valve device opens and closes, respectively, for relieving excessive fluid pressure from any pressure system in which the device is used.

The usual safety valve device of the above-mentioned type is provided with a valve biased toward a cut-off position by a spring and having a pressure area of which only a portion is normally exposed to the system pressure, the balance of the pressure area being isolated outside of the valve seat on which the valve is seated when in its cut-off position. Upon unseating of the valve in response to build-up of excessive system pressure to a value corresponding to the maximum setting acting on the portion of the exposed pressure area, the entire pressure area becomes exposed and subjected to said maximum pressure to thereby promptly move said valve to an exhaust position with what is called a "snap action," because the spring opposing said movement is set to hold said valve seated against said maximum pressure acting against only that portion of the pressure area enclosed by the valve seat when the valve is seated. The valve itself is usually carried by a piston which is slidably operable in a bore in the casing. Since the sliding or frictional operation of the piston is dependent upon accurate and precise machine fitting of the piston in its bore, slight variations in the fit of said piston in its bore may cause undesirable malfunctioning of the device and thereby delay blowdown of the pressure in the system to the predetermined minimum setting. The piston may even stick in one or the other of its positions to render the safety valve device ineffective for its intended purpose.

Accordingly, the object of the present invention is to provide a snap-acting safety valve device that will insure positive, trouble-free operation for relieving the system of excessive fluid pressure build-up. Briefly, the safety valve device embodying the present invention comprises a diaphragm exposed to the system pressure and movable in response to a predetermined degree of excessive build-up for operating a lever between two positions, said lever thereby effecting operation of a pilot valve which, in turn, controls operation of fluid pressure responsive piston valve whereby the system is either vented to atmosphere for relieving the excessive pressure therein or closed off to atmosphere when the pressure has been reduced to a predetermined degree corresponding to the minimum setting.

In the accompanying drawing, FIG. 1 is an elevational view, mainly in section, of a safety valve device embodying the invention, and FIG. 2 is a sectional view of a portion of the safety valve device, taken along line 2—2 of FIG. 1, in the direction indicated by the arrows.

Description and Operation

A safety valve device of the type embodying the invention may comprise a sectionalized casing comprising a main body section 1 having removably and sealingly secured at one end thereof, as by a plurality of bolts 2, an intermediae casing section 3 to which a cup-like end casing section 4 is secured with a movable abutment or diaphragm-type piston 5 peripherally clamped therebetween, said cup-like casing section cooperating with said diaphragm to form a control chamber 6.

The diaphragm 5 has associated therewith a follower 7, secured thereto by a nut 8, and a follower stem 9 extending coaxially from the side of said follower opposite control chamber 6 and in sliding relation through a concentric bore formed in an adjustable bearing nut 10 screwed into a separating wall 11 formed on casing section 3 adjacent casing section 1. A spring 12 is compressed between the follower 7 and the nut 10, which is adapted for adjusting the compression of said spring (for a purpose to be hereinafter explained) by screwing the nut in one axial direction or the other relative to the separating wall 11. The spring 12 biases the diaphragm follower 7, and therefore the diaphragm 5, toward a normal position, in which it is shown in the drawing, defined by engagement of the end of stem 9 adjacent chamber 6 with a boss or projection 13 formed on and internally of the end wall of casing section 4. Fluid under pressure in chamber 6 acting on the face of diaphragm 5 adjacent said chamber at a predetermined maximum pressure sufficient for overcoming the opposing force of spring 12, as determined by the setting of nut 10, moves said diaphragm and stem 9 in a right-hand direction, as viewed in the drawing, to a second or exhaust position determined by engagement of an annular collar 14, formed on said stem, with the nut 10 on the side adjacent chamber 6.

Stem 9, as above noted, extends through nut 10 and terminates in atmospheric chamber 15 formed by casing section 1, wall 11 of casing section 3 and a separating wall 16 formed perpendicular to the axis of casing section 1 intermediate its two ends. A bifurcated lever 17 (see FIG. 2) is pivotally supported at the free ends of a pair of arms 18 forming the yoke portion of said lever by respective pins 19 oppositely situated in the walls of casing section 1 on a horizontal axis, as viewed in the drawing, perpendicular to the axis of stem 9 and just above the end of said stem in chamber 15, whereby said lever is pivotally movable about said horizontal axis. A horizontal slot 20 extends through stem 9 adjacent the end in chamber 15 and perpendicularly to the axis of said stem for receiving a floating pin 21, the ends of which extend out of said slot on opposite sides of the stem, each of said ends having fastened thereto, in suitable annular grooves formed in said pin, one end of two springs 22, respectively, whereby said pin is prevented from escaping out of said slot. The ends of springs 22 opposite the ends fastened to pin 21 are fastened in annular grooves formed adjacent the respective ends of a pin 23 passing perpendicularly through the lever 17 adjacent the end opposite the yoke arms 18 and parallel to pin 21, whereby said springs are placed under tension and said opposite end of said lever is subjected to a force exerted thereon by said springs in a direction toward pin 21. Slot 20, and therefore pin 21, is located in stem 9 in such a position that, as diaphragm 5 and said stem move between their exhaust and normal positions, the axis of said pin 21 traces a plane of travel, which, as viewed in FIG. 1 of the drawing, is indicated by line P—P. The axis of pin 21 moves back and forth between and slightly beyond two points of intersection made by plane P—P, in one instance, with the extended axis of the lever 17 when said lever is in a normal position defined by engagement of the end of the lever adjacent pin 23 with a boss 24 formed on casing wall 11, and, in the other instance when said lever is in an exhaust position to be subsequently described and indicated in the drawing in broken-line outline of the lever, the extended axis of said lever in each position of the lever being indicated in the drawing by lines N—N and E—E, respectively. Pin 21 is free to move in slot 20 between one end of said slot and the internal end of an adjusting screw 24 screwed into the opposite end of said slot coaxially through the end of stem 9 for a purpose to be hereinafter explained. Therefore, when lever 17 is in its normal position, pin 21 rests against the end of slot 20 adjacent nut 10, and when said lever is in its exhaust position, said pin rests against the end of screw 25 within said slot.

Movement of pin 21 by stem 9 through the plane P—P in one direction or the other causes a corresponding shifting of the directional force exerted by springs 22 on lever 17 to the opposite side of the axis or "dead-center" position of said lever corresponding to either its E—E or N—N position, and thereby a corresponding pivoting of lever 17 about the axis of pins 19, or an action, whereby said lever is caused to occupy either its normal position, as above defined, or its exhaust position indicated in the drawing in broken outline and to be presently described.

The upper portion of casing section 1 to the right side of separating wall 16, as viewed in the drawing, has a bore 26 in parallel axial relation to the axis of said casing section and in which a spool-type pilot valve 27 is slidably operable. An operating stem 28 extends coaxially from one side of the pilot valve 27 through separating wall 16 into chamber 15, the free end of said stem, which is preferably provided with a roller, being engageable by the end of lever 17 adjacent pin 23 when said lever moves from its normal to its exhaust position. Pilot valve 27 and stem 28 are biased toward a normal position, in which they are shown in the drawing and determined by engagement of said spool valve with wall 16, by a spring 29 compressed between said piston valve and a closure cap 30 sealingly secured to casing section 1, as by a plurality of bolts 31, for closing off the end of said casing section opposite casing section 3. Pilot valve 27 is moved to its normal position by spring 29 upon movement of lever 17 to its normal position, in a manner to be hereinafter explained. The length of stem 28 is such that, when pilot valve 27 and lever 17 are in their respective normal positions, in which lever 17 rests against boss 24, the end of said stem adjacent said lever will be just short of engagement therewith in order to insure full movement of the pilot valve to its normal position. Movement of lever 17 to its exhaust position causes pilot valve 27 to be operated to an exhaust position, the exhaust positions of both the valve and the lever being defined by engagement of an annular collar 32, formed on stem 28, with separating wall 16 on the side adjacent chamber 15.

In the lower portion of casing section 1 and to the right side of separating wall 16, as viewed in the drawing, still another bore 33, separated from bore 26 by an intervening casing wall therebetween, is provided in which a piston 34 is slidably operable, said bore being closed at one end by separating wall 16 and at the other end by closure cap 30. A separating wall 35 is removably secured in bore 33, intermediate the ends and perpendicularly to the axis of said bore, as by screw threads, with the piston 34 being operably disposed between the two separating walls 16 and 35. A valve stem 36 having one end fixed to the side of piston 34 adjacent wall 35, extends coaxially through a concentric bore 37 formed in the separating wall 35 and carries at its opposite end an exhaust valve 38 adapted to seat on a valve seat 39 formed in separating wall 35, in which position said valve is shown in the drawing. Separating wall 35 and closure cap 30 cooperate with casing section 1 to form an inlet chamber 40 which is constantly connected to a source (not shown) of fluid under pressure, such as a line or reservoir, for example, through an inlet port 41 formed in closure cap 30 to which port a conduit 42 leading to the line or reservoir is connected. When exhaust valve 38 is unseated from valve seat 39, in a manner to be hereinafter described, inlet chamber 40 is opened to atmosphere past valve stem 36 via a passageway 43 formed in separating wall 35 and opening to bore 37 at one end and to a vent port 44 formed in the casing wall of casing section 1. With exhaust valve 38 moved into seated relation on seat 39, in a manner to be later described, communication of inlet chamber 40 with atmosphere, as immediately above described, is cut off.

The piston 34 and separating wall 16 cooperate with casing section 1 to form a pressure chamber 45, said piston having a normal position, in which it is shown in the drawing, defined by seating of exhaust valve 38 on valve seat 39 and being operable to an exhaust position for unseating said valve, said exhaust position being defined by engagement of an annular collar 46, formed on stem 36, with separating wall 35 on the side adjacent said piston. A spring 47 serves to bias piston 34 and valve 38 toward their normal and seated positions, respectively, by being compressed between said piston and separating wall 35.

A passageway 48, formed partly in separating wall 16 and partly in the intervening wall between bores 26 and 33, has one end opening into pressure chamber 45 while the other end opens to the bore 26. An annular recess 49 formed on the pilot valve 27 intermediate its ends registers with passageway 48 when said spool valve is in its exhaust position and with a passageway 50 having one end opening to bore 26, said passageway 50 being formed partly in casing section 1 and partly in closure cap 30 where it leads to inlet port 41 and connects with conduit 42. When spool valve 27 is operated to its normal position, recess 49 is moved out of registry with passageways 48 and 50 so that passageway 50 is lapped off and passageway 48 is placed in communication with an atmospheric port 51 formed in the wall of casing section 1 to thereby vent chamber 45 to atmosphere. Another passageway 52 having connected portions formed in the several casing sections has one end open to control chamber 6 while the opposite end opens to inlet port 41 and thus to conduit 42.

In operation, let it be assumed that conduit 42 is connected to a fluid pressure line or reservoir (not shown) which is to be protected from excessive fluid pressure build-up therein beyond a predetermined maximum pressure. Let it further be assumed, therefore, that the compression of spring 12 has been adjusted in accordance with the predetermined maximum pressure so that upon build-up of pressure in the line or reservoir to said maximum, such pressure acting on the pressure area of diaphragm 5 adjacent chamber 6, which, as above noted, is open to conduit 42 by way of passageway 52, is effective for overcoming the opposing force of said spring to move diaphragm 5 and stem 9 to their exhaust positions. Movement of stem 9 to its exhaust position causes operation of the lever 17 to its exhaust position, said lever, acting through stem 28, effecting movement of pilot valve 27 to its exhaust position against opposing force of spring 29. With valve 27 in its exhaust position, passageway 50 is in communication, through recess 49, with passageway 48, and fluid at the pressure presently obtaining at inlet port 41 and, therefore, in the line or reservoir is thus supplied to pressure chamber 45 to act on piston 34 for moving said piston positively and quickly to its exhaust position and for thus correspondingly unseating exhaust valve 38, thereby venting conduit 42 and the connected line or reservoir to atmosphere by way of port 41, chamber 40, past valve 38 and the valve stem 36, through passageway 43 and out vent port 44. As the pressure of fluid in the line or reservoir is thus reduced, fluid pressure in control chamber 6 is correspondingly reduced, since said chamber is connected to conduit 42 and the fluid pressure of the line or reservoir by way of passageway 52, until pressure in the line or reservoir and in said chamber has reduced to a pre-established minimum degree of pressure as determined by the adjustment of screw 25.

Since pin 21 rests against the end of screw 25, as above noted, only when lever 17 is in its exhaust position, it should be apparent that any adjustment of said screw affects only the minimum pressure setting at which fluid pressure reduction is terminated. It should also be apparent that the greater the distance between the axis of pin 21 and the axis of lever 17, when in either the E—E or N—N positions, the shorter and more relaxed are springs 22, and, therefore, the greater is the total force (exerted through stem 9) necessary for stretching said springs sufficiently to shift them, and consequently the directional force exerted by their tension, over the axis or dead-center position of said lever from one position or the other to cause the lever to be correspondingly shifted. It follows, therefore, that after the compression of spring 12 has been adjusted by nut 10 to correspond to the desired maximum pressure setting at which relief of fluid pressure from the line or reservoir is initiated, if screw 25 is screwed out from slot 20, the lower will be the minimum pressure setting and, therefore, the greater the range between the maximum and minimum settings. Obviously the converse would be true if screw 25 were screwed into slot 20. The adjusting screw 25 is therefore useful at different times for at least two purposes: (1) to adjust the magnitude of the operating pressure range, that is, the difference between the maximum and minimum pressure settings, after the maximum setting has been determined by adjustment of nut 10, and (2) for maintaining a given magnitude of the operating pressure range if it becomes necessary to readjust or change the maximum setting.

When the pressure of fluid in chamber 6 has thus been reduced by way of passageway 52, port 41, chamber 40, past exhaust valve 38 and valve stem 36, through passageway 43 and out vent port 44, to the predetermined minimum pressure, spring 12 moves diaphragm 5 and stem 9 to their normal positions, thereby causing lever 17 to be operated to its normal position. Movement of lever 17 to its normal position renders spring 29 effective to move pilot valve 27 to its normal position in which, as above noted, communication between passageways 48 and 50 is disrupted, and said passageway 48 is placed in communication with vent port 51 to cause chamber 45 to be vented to atmosphere. With pressure in chamber 45 reduced to atmospheric pressure, spring 47 is effective for moving piston 34 to its normal position in which exhaust valve 38 is seated on seat 39 whereby communication between passageway 43 (leading to atmosphere through port 44) and chamber 40 is cut off to stop further venting of conduit 42 and therefore reduction of line or reservoir pressure.

With the line or reservoir cut off from atmosphere in the manner above described, fluid pressure therein and, therefore, in chamber 6 may commence to build up again. If such pressure builds up to the predetermined maximum, it again acts on diaphragm 5 to initiate the exhaust cycle, as above described and cause the line or reservoir pressure to be reduced until it reaches the minimum valve, at which the device operates through the cut-off cycle, as above described, to cut off further exhausting. In the manner described, therefore, the safety valve device operates to prevent build-up of fluid pressure in the line or reservoir beyond a pre-established safe degree corresponding to the maximum pressure setting of the safety valve device, and automatically reduces the pressure in the line or reservoir a certain amount.

Having now described the invention, what I claim as new and desire to secure by Letters Patent, is:

1. A fluid pressure responsive snap-acting mechanism comprising:
   (a) a supporting member,
   (b) an actuating lever pivotally supported at one end on said supporting member, and having its opposite end free to move,
   (c) fluid pressure responsive means carried by said supporting member and including,
   (I) a diaphragm piston adapted to be subject in a chamber at one side thereof to fluid at varying pressure,
   (II) a stem shiftable axially by said diaphragm piston responsively to variation of fluid pressure in said chamber,
   (III) spring means interposed between said diaphragm piston and said supporting member for yieldingly opposing axial movement of said stem in one direction responsively to an increasing fluid pressure acting on said diaphragm piston and for restoring said stem reversely responsively to reduction of the fluid pressure acting on said diaphragm piston,
   (IV) said stem having an axially extending slot therein and
   (V) a floating pin slidably movable in said slot,
   (VI) tensioned spring means secured at one end to the free end of said lever and at the other end to said pin, and
   (VII) means carried on said stem operable to vary the length of said slot therein,
   (d) movement of said stem in said one direction responsively to fluid pressure exceeding a certain value effecting movement of said pin with said stem so as to effect stretching of said tensioned spring means which becomes active upon swinging movement past the dead center line of said lever to rock said lever from a normal position to an operated position by snap-action, said pin coincidentally being shifted to the opposite end of said slot whereby to render the said tensioned spring means effective to yieldingly resist return pivotal movement of said lever back to its normal position until the fluid pressure acting and said diaphragm piston reduces a certain uniform amount below said certain value, the range between maximum and minimum fluid pressures for effecting snap-acting pivotal movement of said lever between its said normal and operated positions being variable according to the length of said slot.

2. A fluid pressure responsive snap-acting mechanism as defined in claim 1, wherein said means for varying the length of said slot comprises a screw-threaded member coaxially disposed in one end of said stem and extending into said slot, said screw-threaded member being extendable into and retractable out of said slot for varying the length of the slot accordingly, and a locking member carried by said screw-threaded member for locking the latter in a selected position.

References Cited in the file of this patent

UNITED STATES PATENTS

| | | |
|---|---|---|
| 1,056,005 | Cockburn | Mar. 18, 1913 |
| 1,110,320 | Fulton | Sept. 15, 1914 |
| 1,192,774 | Eidson | July 25, 1916 |
| 1,210,706 | Schwartz | Jan. 2, 1917 |
| 2,383,710 | Haddock | Aug. 14, 1945 |
| 2,473,901 | Pierce | June 21, 1949 |
| 2,618,160 | Atchison | Nov. 18, 1952 |
| 2,643,676 | Curran | June 30, 1953 |
| 2,930,066 | Deibel | Mar. 25, 1960 |

FOREIGN PATENTS

| | | |
|---|---|---|
| 26,746 | Netherlands | Dec. 15, 1932 |